United States Patent
Kim et al.

(10) Patent No.: US 7,253,867 B2
(45) Date of Patent: Aug. 7, 2007

(54) LIQUID CRYSTAL DISPLAY DEVICE INCLUDING STEP-COMPENSATING PATTERN AND FABRICATING METHOD THEREOF

(75) Inventors: Jin-Tae Kim, Gyeongsangbuk-do (KR); Jae-Seok Park, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/404,349

(22) Filed: Apr. 2, 2003

(65) Prior Publication Data
US 2003/0189680 A1     Oct. 9, 2003

(30) Foreign Application Priority Data
Apr. 8, 2002     (KR) .................. 10-2002-0018960

(51) Int. Cl.
*G02F 1/1339* (2006.01)
(52) U.S. Cl. .................. 349/153; 349/140; 349/147; 349/149
(58) Field of Classification Search .............. 349/139, 349/140, 143, 147, 149, 152, 153
See application file for complete search history.

(56) References Cited

U.S. PATENT DOCUMENTS

| | | | |
|---|---|---|---|
| 5,513,028 A * | 4/1996 | Sono et al. .................. 349/139 |
| 6,239,854 B1 * | 5/2001 | Hirakata et al. ............. 349/149 |
| 6,549,259 B2 * | 4/2003 | Sato et al. ................... 349/153 |
| 6,774,968 B2 * | 8/2004 | Hagiwara .................... 349/139 |
| 2001/0013918 A1 * | 8/2001 | Kwak et al. ................. 349/153 |
| 2001/0022639 A1 * | 9/2001 | Kwak et al. ................. 349/122 |

FOREIGN PATENT DOCUMENTS

| | | |
|---|---|---|
| JP | 2000-056319 | 2/2000 |
| KR | 10-0355940 | 9/2002 |

* cited by examiner

*Primary Examiner*—David Nelms
*Assistant Examiner*—Michael H. Caley
(74) *Attorney, Agent, or Firm*—McKenna Long & Aldridge LLP

(57) ABSTRACT

A liquid crystal display device includes first substrate having an active region and a non-active region along a peripheral portion of the active region, a second substrate facing and spaced apart from the first substrate, and having an active region and a non-active region along a peripheral portion of the active region, a seal pattern between the first and second substrates disposed along a border of the active and non-active regions, a gate line on an interior surface of the first substrate and crossing the seal pattern, a data line crossing the gate line and the seal pattern, a thin film transistor connected to the gate line and the data line, a pixel electrode connected to the thin film transistor, a common electrode on an interior surface of the second surface, a first step-compensating pattern adjacent to the seal pattern and the gate line, a second step-compensating pattern adjacent to the seal pattern and the data line, and a liquid crystal material layer between the pixel electrode and the common electrode.

9 Claims, 9 Drawing Sheets

LIQUID CRYSTAL DISPLAY DEVICE INCLUDING STEP-COMPENSATING PATTERN AND FABRICATING METHOD THEREOF

The present invention claims the benefit of the Korean Patent Application No. 2002-18960 filed in Korea on Apr. 8, 2002, which is hereby incorporated by reference.

BACKGROUND OF THE INVENTION

1. Field of the Invention

The present invention relates to a liquid crystal display device, and more particularly, to a liquid crystal panel having a step-compensating pattern and a fabricating method thereof.

2. Discussion of the Related Art

In general, a liquid crystal display (LCD) device makes use of optical anisotropy and polarization properties of liquid crystal molecules. The liquid crystal molecules have a definite orientational alignment that results from their thin, long shape. The alignment direction of the liquid crystal molecules can be controlled by application of an electric field to the liquid crystal molecules. Accordingly, as an intensity of the applied electric field changes, the alignment orientation of the liquid crystal molecules also changes. Since incident light through a liquid crystal material is refracted due to an orientation of the liquid crystal molecules resulting from the optical anisotropy of the aligned liquid crystal molecules, an intensity of the incident light can be controlled and images can be displayed.

Among the various type of LCD devices commonly used, active matrix LCD (AM-LCD) devices where thin film transistors (TFTs) and pixel electrodes connected to the TFTs are disposed in matrix have been developed because of their high resolution and superior display of moving images.

FIG. 1 is a plan view of a liquid crystal panel for a liquid crystal display device according to a related art. In FIG. 1, a liquid crystal panel includes an active region "I" and a non-active region "II" disposed at a peripheral portion of the active region "I." First and second substrates 10 and 30 face each other, and a seal pattern 40 for attaching the first and second substrates 10 and 30 is formed between the first and second substrates 10 and 30. A liquid crystal material layer 50 is disposed at an interior region of the seal pattern 40, and is formed by injecting liquid crystal material through an injection hole 42 of the seal pattern 40. After injecting the liquid crystal material, the injection hole 42 is closed with a bonding seal 44 to prevent a leakage of the injected liquid crystal material.

A plurality of gate lines 12 and a plurality of data lines 14 are formed at the active region "I," to cross each other, a thin film transistor (TFT) "T" is disposed at a cross of the gate line 12 and the data line 14, and a pixel electrode 16 is connected to the TFT "T." Although not shown in FIG. 1, a color filter layer, which includes red, green, and blue sub color filters, a black matrix, which is formed at a borderline between the adjacent sub color filters and a non-pixel region, and a common electrode are all formed on an interior surface of the second substrate 30.

The non-active region "II" is classified into a first non-active region "IIa" and a second non-active region "IIb," wherein the first non-active region "IIa" is disposed on the first substrate 10 and the second non-active region "IIb" is disposed on the second substrate 30 to be surrounded by the first non-active region "IIa." A gate pad 18 that connects the gate line 12 and an external circuit, and a data pad 20 that connects the data line 14 and an external circuit are formed within the first non-active region "IIa."

Array patterns, such as the gate line 12 and the data line 14, are formed through a photolithographic process where the same photoresist (PR) patterns as the array patterns are obtained by selectively exposing the PR of a photosensitive material using a photo mask. Chemical and physical process steps are repeated during the photolithographic process. As the number of the process steps increases, fabrication costs and possibilities of damage to the array patterns also increase. Accordingly, a fabricating process using a reduced number of masks has been developed. Thus, a five mask process that includes steps of forming a gate line, a semiconductor layer, a data line, a contact hole, and a pixel electrode may be replaced with a four mask process where the steps of forming the semiconductor layer and the data line are combined into a single step.

FIGS. 2A to 2C are cross-sectional views showing forming of a thin film transistor portion, a gate line portion, and a data line portion of a liquid crystal panel using a four mask process according to the related art, respectively. In FIG. 2A, a gate electrode 60 is formed on a substrate 1, a gate insulating layer 62 is formed on the gate electrode 60, and a semiconductor layer 64 and source and drain electrodes 66 and 68 are sequentially formed on the gate insulating layer 62. The gate electrode 60, the semiconductor layer 64, and the source and drain electrodes 66 and 68 compose a thin film transistor (TFT) "T." A passivation layer 72, which includes a drain contact hole 70, is formed on the TFT "T," and a pixel electrode 74 is formed on the passivation layer 72. The drain contact hole 70 exposes the drain electrode 68 and the pixel electrode 74 is connected to the drain electrode 68 through the drain contact hole 70. The semiconductor layer 64 includes an active layer 64a of pure amorphous silicon (a-Si) and an ohmic contact layer 64b of impurity-doped amorphous silicon (n+a-Si). The ohmic contact layer 64b between the source and drain electrodes 66 and 68 is eliminated, and the active layer 64a under the eliminated ohmic contact layer 64b is exposed to form a channel region "ch" of the TFT "T." In a four mask process where the semiconductor layer 64 and the source and drain electrodes 66 and 68 are etched at one time, the channel region "ch" is formed by using a diffraction mask where light transmittance is adjusted by diffraction.

In FIG. 2B, a gate line 76, a gate insulating layer 62, and a passivation layer 72 are sequentially formed on a substrate 1, and the gate line 76 is simultaneously formed with formation of a gate electrode 60 (in FIG. 2A).

In FIG. 2C, a gate insulating layer 62 is formed on a substrate 1, and a semiconductor 64 and a data line 78 are sequentially formed on the gate insulating layer 62. The data line 78 is simultaneously formed with formation of the source and drain electrodes 66 and 68 (in FIG. 2A),and a passivation layer 72 is formed on the data line 78.

In general, since the steps of forming the semiconductor layer and the data line are performed at one time using a single photo mask in a four mask process, the semiconductor layer 64 has the same pattern as the data line 78 and the source and drain electrodes 66 and 68. Accordingly, a first accumulated thickness D1 (in FIG. 2B) of a gate line portion is different from a second accumulated thickness D2 (in FIG. 2C) of a data line portion. The difference between the first and second accumulated thicknesses "D1" and "D2" results from a difference between the thickness of the gate line 76 (in FIG. 2B) and the thickness of the semiconductor layer and the data line 64 and 78 (in FIG. 2C). For example, when the gate line has a thickness of 2700 Å, the gate insulating layer has a thickness of 4000 Å, the semiconductor layer has a thickness of 2000 Å, the data line has a thickness of 1500 Å, and the passivation layer has a thickness of 2000 Å. Accordingly, the first accumulated thickness D1 of the gate line portion is 8700 Å and the second accumulated thickness D2 of the data line portion is 9500 Å. The difference between the first and second accumulated thicknesses "D1" and "D2" is 800 Å. This difference creates a cell gap difference at a peripheral portion of the seal pattern, whereby non-uniformity of the cell gap creates spots in displayed images.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device having a high display quality by creating a uniform cell gap difference at a peripheral portion of a seal pattern.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first substrate having an active region and a non-active region along a peripheral portion of the active region, a second substrate facing and spaced apart from the first substrate, and having an active region and a non-active region along a peripheral portion of the active region, a seal pattern between the first and second substrates disposed along a border of the active and non-active regions, a gate line on an interior surface of the first substrate and crossing the seal pattern, a data line crossing the gate line and the seal pattern, a thin film transistor connected to the gate line and the data line, a pixel electrode connected to the thin film transistor, a common electrode on an interior surface of the second surface, a first step-compensating pattern adjacent to the seal pattern and the gate line, a second step-compensating pattern adjacent to the seal pattern and the data line, and a liquid crystal material layer between the pixel electrode and the common electrode.

In another aspect, a fabricating method of a liquid crystal display device includes forming a gate line and a first step-compensating pattern on a first substrate having an active region and a non-active region along a peripheral portion of the active region, the first step-compensating pattern being disposed along a border of the active and non-active regions, forming a data line crossing the gate line and a second step-compensating pattern along the border of the active and non-active regions, forming a thin film transistor connected to the gate line and the data line, forming a pixel electrode connected to the thin film transistor, forming a common electrode on an interior surface of a second surface, forming a seal pattern along the border of the active and non-active regions, the seal pattern crossing the gate line and the data line, attaching the first and second substrates such that the pixel electrode faces the common electrode, and forming a liquid crystal material layer between the pixel electrode and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
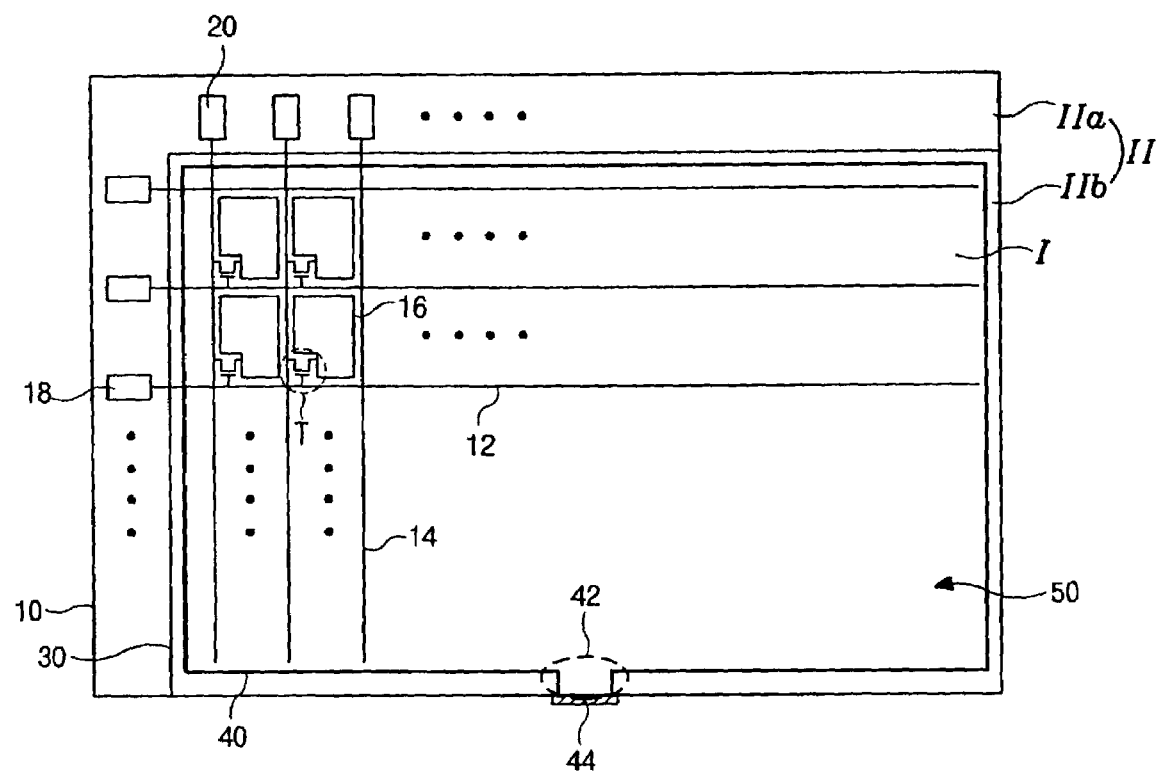
FIG. 1 is a plan view of a liquid crystal panel for a liquid crystal display device according to a related art.
Figure 2A:
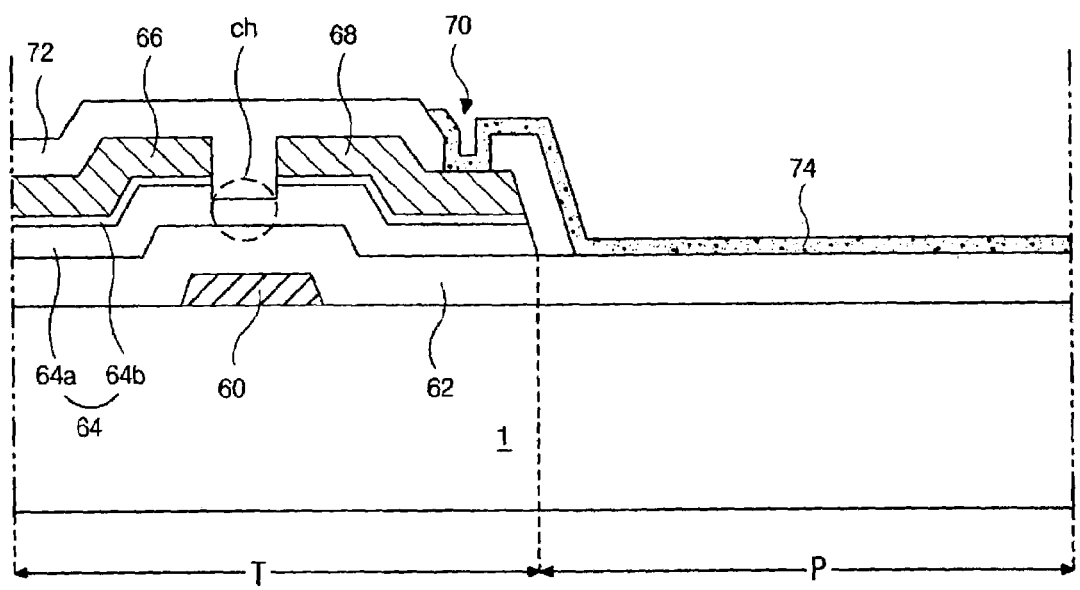
FIG. 2A is a cross-sectional view of a thin film transistor portion of a liquid crystal panel using a four mask process for a liquid crystal display device according to a related art.
Figure 2B:
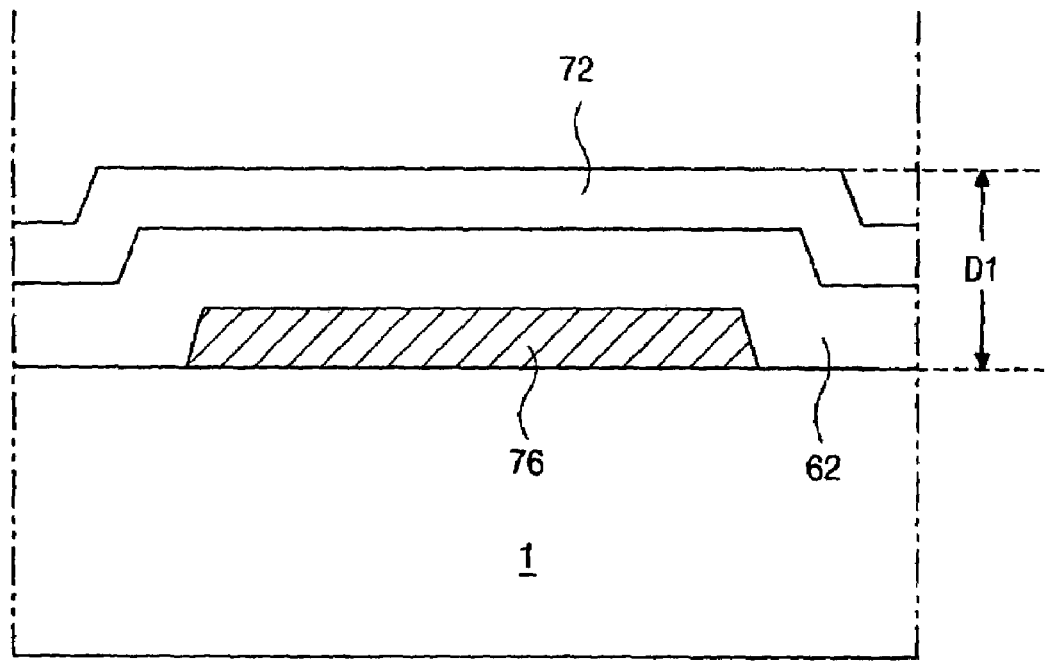
FIG. 2B is a cross-sectional view of a gate line portion of a liquid crystal panel using a four mask process for a liquid crystal display device according to a related art.
Figure 2C:
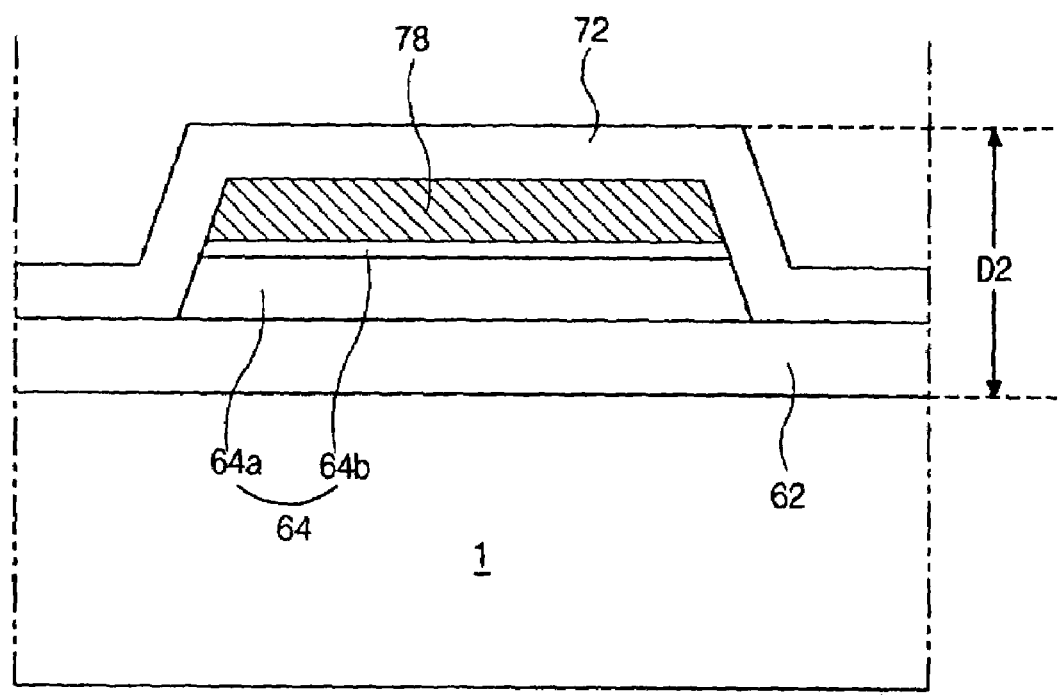
FIG. 2C is a cross-sectional view of a data line portion of a liquid crystal panel using a four mask process for a liquid crystal display device according to a related art.
Figure 3:
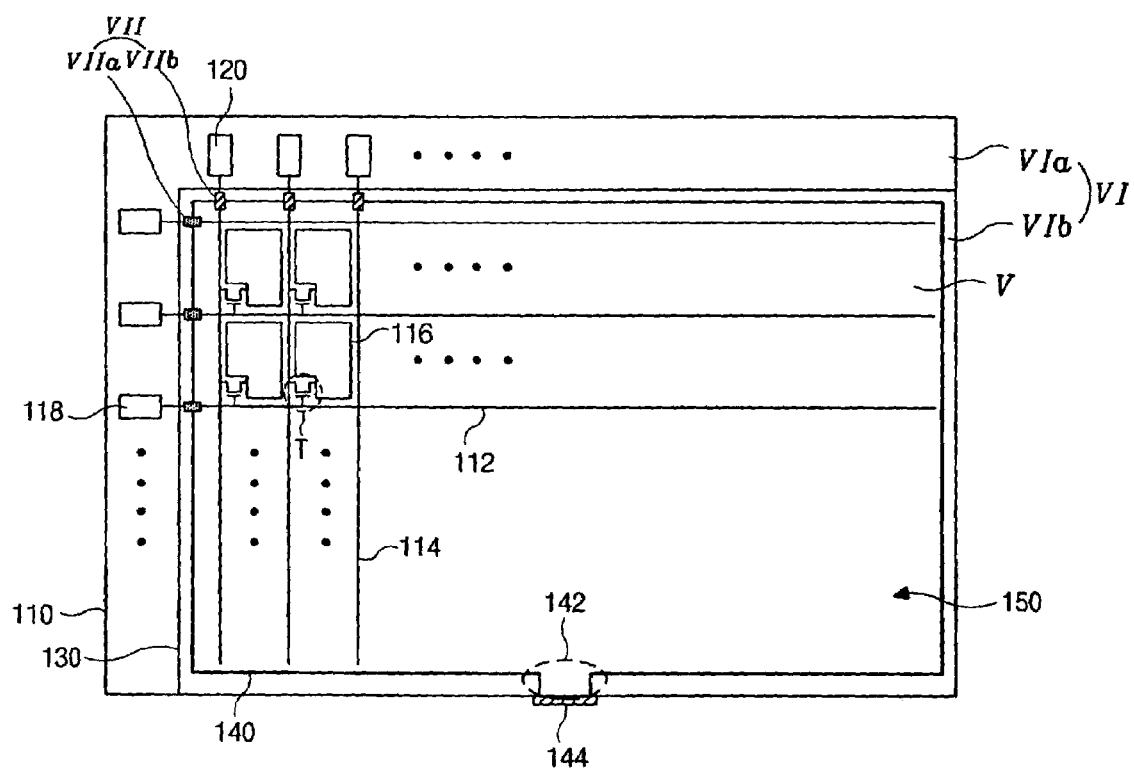
FIG. 3 is a plan view of an exemplary liquid crystal display device according to the present invention.

FIG. 3 is a plan view of an exemplary liquid crystal display device according to the present invention. In FIG. 3, first and second substrates 110 and 130 may be attached together to face each other. The bonded substrates may include an active region "V" and a non-active region "VI" disposed along a peripheral portion of the active region "V." A seal pattern 140 used to attach the first and second substrates 110 and 130 may be formed along a border region of the active and non-active regions "V" and "VI." A liquid crystal material layer 150 may be disposed along an interior region of the seal pattern 140. The seal pattern 140 may include an injection hole 142 and a bonding seal 144 for preventing leakage of the liquid crystal material layer 150. The non-active region "VI" may be classified into first and second non-active regions "VIa" and "VIb," wherein the first non-active region "VIa" of the first substrate 110 may extend to an outer portion of the second non-reactive region "VIb" of the second substrate 130.

A gate line 112 and a data line 114 may be formed on the first substrate 110 at the active region "V" to cross each other, and to cross the seal pattern 140. A thin film transistor (TFT) "T" may be disposed at the crossing of the gate and data lines 112 and 114, and a pixel electrode 116 may be connected to the TFT "T." A gate pad 118 may be formed on at the first non-active region "Va" of the first substrate 110 to interconnect the gate line 112 and an external circuit (not shown). In addition, a data pad 120 may be formed on at the first non-active region "Va" of the first substrate 110 to interconnect the data line 114 and another external circuit (not shown).

A first step-compensating pattern region "VIIa" may be disposed at a first crossing region of the seal pattern 140 and the gate line 112, and a second step-compensating pattern region "VIIb" may be disposed at a second crossing region of the seal pattern 140 and the data line 114. In addition, the first step-compensating pattern region "VIIa" may have the same accumulated thickness as the second step-compensating pattern region "VIIb." Although not shown in FIG. 3, a color filter layer, which includes red, green, and blue sub-color filters, a black matrix, which may be formed along a borderline region between the adjacent sub-color filters and a non-pixel region, and a common electrode may be formed on an interior surface of the second substrate 130.

Figure 4A:
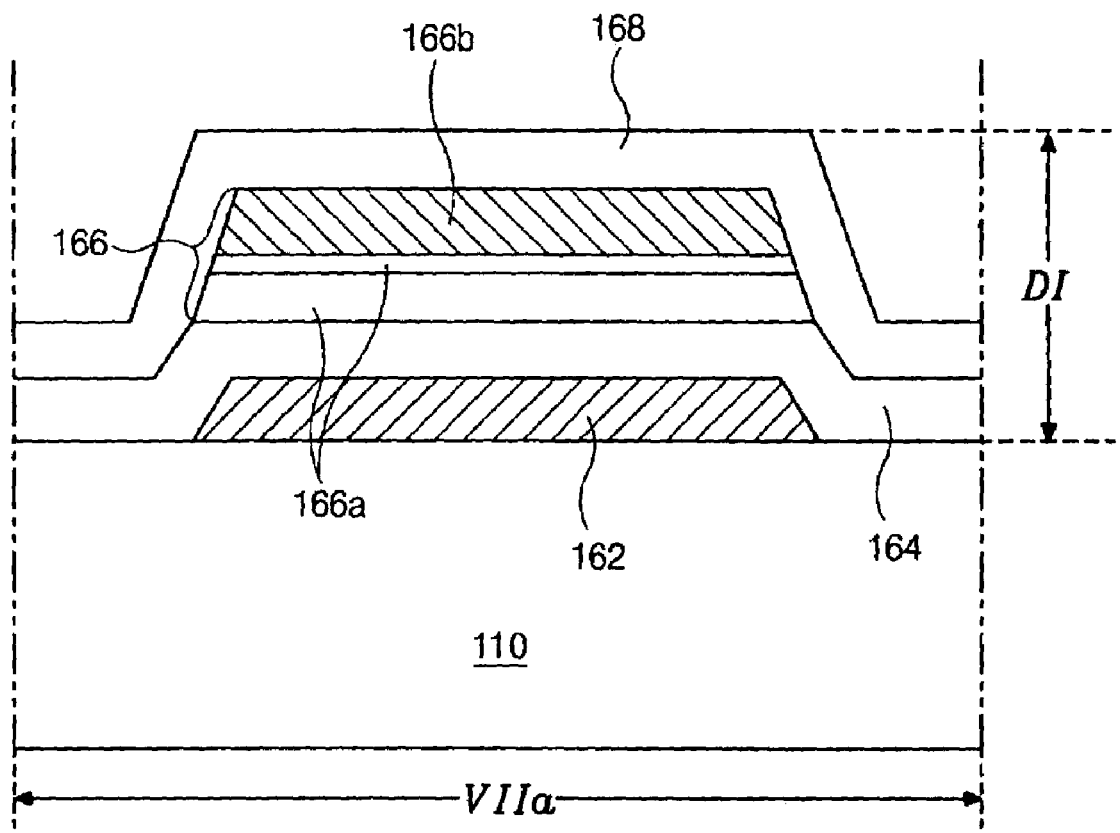
FIG. 4A is a cross-sectional view of an exemplary first step-compensating pattern of FIG. 3 according to the present invention.

FIG. 4A is a cross-sectional view of an exemplary first step-compensating pattern of FIG. 3 according to the present invention. In FIG. 4A, the gate line 162 may be formed on the substrate 110 at the first step-compensating pattern region "VIIa," and a gate insulating layer 164 may be formed on the gate line 162. A first step-compensating pattern 166 may be formed on the gate insulating layer 164, and a passivation layer 168 may be formed on the first step-compensating pattern 166. The first step-compensating pattern 166 may include a semiconductor pattern 166a and a data pattern 166b formed on the semiconductor pattern 166a. The semiconductor pattern 166a may be simultaneously formed with formation of a semiconductor layer (not shown) of a thin film transistor (TFT) "T" (in FIG. 3) and may include the same material as that of the semiconductor layer (not shown). In addition, the data pattern 166b may be simultaneously formed with formation of the data line 114 (in FIG. 3), and may include the same material as the data line 114 (in FIG. 3). Thus, the first step-compensating pattern region "VIIa" includes a first accumulated thickness "DI."

Figure 4B:
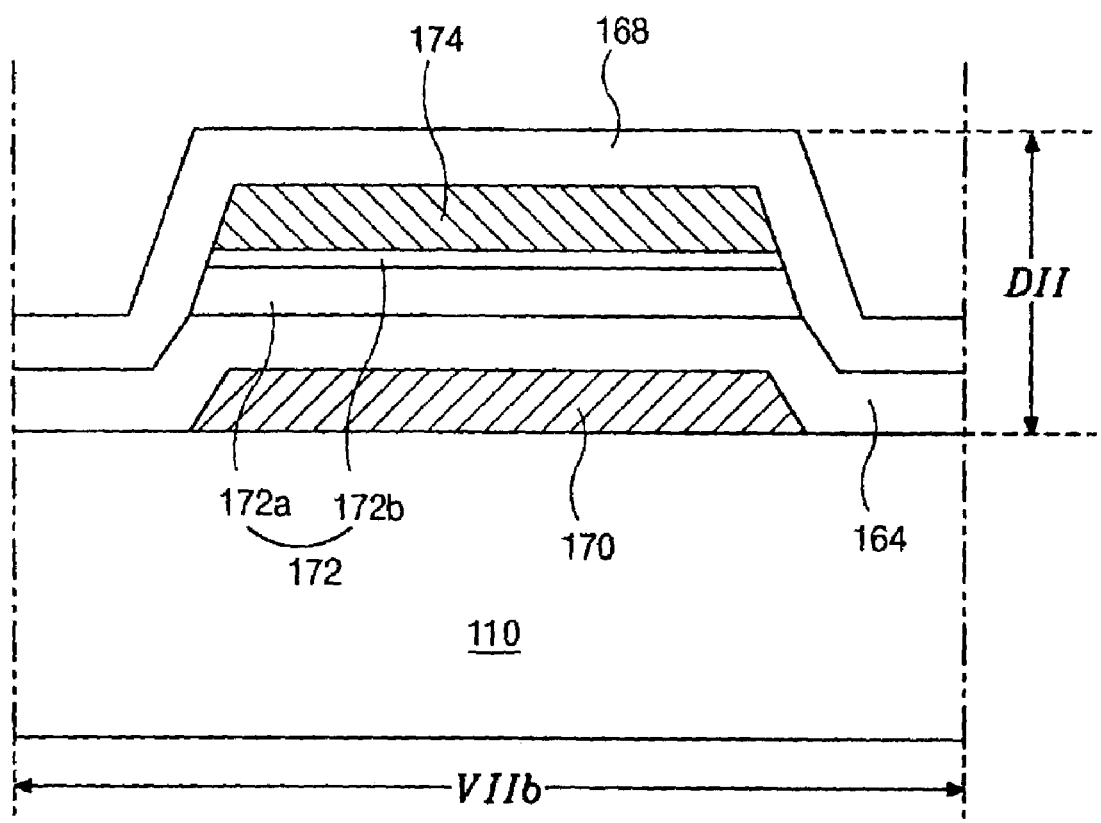
FIG. 4B is a cross-sectional views of an exemplary second step-compensating pattern of FIG. 3 according to the present invention.

FIG. 4B is a cross-sectional view of an exemplary second step-compensating pattern of FIG. 3 according to the present invention. In FIG. 4B, a second step-compensating pattern 170 may be formed on a substrate 110 at the second step-compensating pattern region "VIIb," and a gate insulating layer 164 may be formed on the second step-compensating pattern 170. A semiconductor layer 172 and a data line 174 that corresponds to the semiconductor layer 172 may be sequentially formed on the gate insulating layer 164, wherein the semiconductor layer 172 may include an active layer 172a and an ohmic contact layer 172b formed on the active layer 172a. In addition, a passivation layer 168 may be formed on the data line 174. The second step-compensating pattern 170 may be simultaneously formed with formation of the gate line 162 (in FIG. 4A), and may include the same material as the gate line 162 (in FIG. 4A). Since the second step-compensating pattern region "VIIb" may have a corresponding structure to the first step-compensating pattern region "VIIa," a second accumulated thickness "DII" of the second step-compensating pattern region "VIIb" may be nearly the same value as the first accumulated thickness "DI" of the first step-compensating pattern region "VIIa." Accordingly, a uniform cell gap difference at a portion adjacent to a seal pattern is obtained due to the first and second step-compensating patterns 166 and 170.

Figure 5:
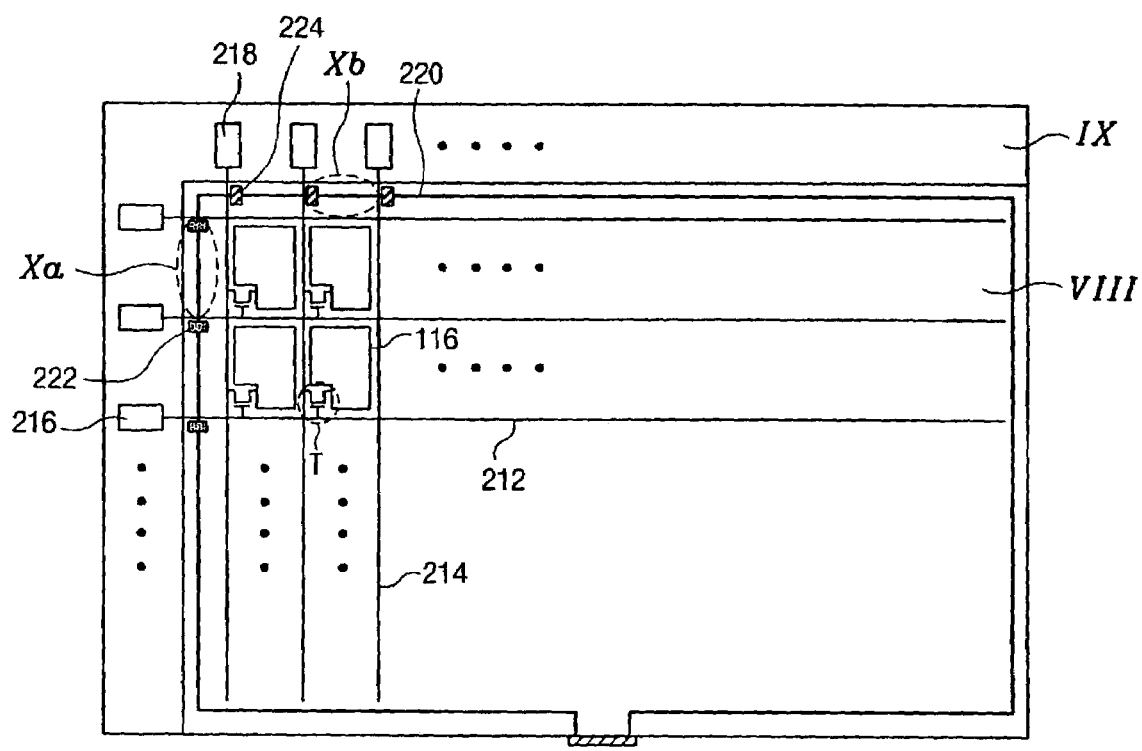
FIG. 5 is a plan view of another exemplary liquid crystal display device according to the present invention.

FIG. 5 is a plan view of another exemplary liquid crystal display device according to the present invention. Since the exemplary liquid crystal display device of FIG. 5 may have a similar structure to that of FIG. 3, some features may not be explained, but nonetheless are included. In FIG. 5, a gate line 212 and a data line 214 may be disposed to cross each other, wherein a gate pad 216 and a data pad 218 are connected to the gate line 212 and the data line 214, respectively. A seal pattern 220 may be formed along a border region of active and non-active regions "VIII" and "IX," which is a connection portion of the gate pad 216 and the gate line 212, and of the data pad 218 and the data line 214. The gate line 212 and the data line 214 may be formed to cross the seal pattern 220. A first step-compensating pattern 222 may be formed under the seal pattern 220 at a first spacing region "Xa" between the adjacent gate lines 212, and a second step-compensating pattern 224 may be formed under the seal pattern 220 at a second spacing region "Xb" between the adjacent data lines 214.

In FIGS. 3, 4A and 4B, the step-compensating patterns may be formed over the gate line or under the data line so that a uniform accumulated thickness may be obtained at the crossing of the gate and data lines under the seal pattern. Alternatively, as shown in FIG. 5, the first step-compensating pattern 222 having the same structure as the data line 214 may be disposed at a first spacing region "Xa" between adjacent gate lines 212, and the second step-compensating pattern 224 may be disposed at a second spacing region "Xb" between adjacent data lines 214. Accordingly, the uniform accumulated thickness may be obtained near the seal pattern 220 at the crossing of the gate and data lines 212 and 214.

Figure 6A:
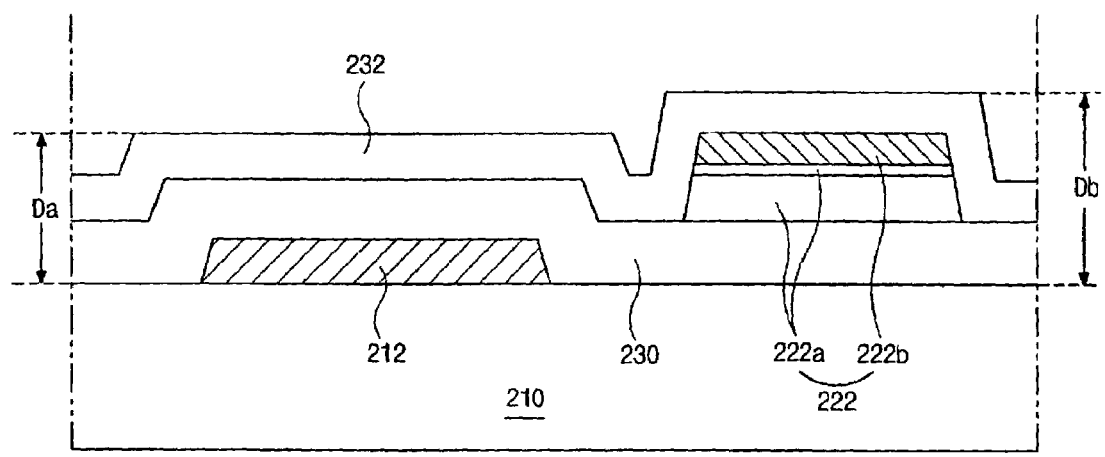
FIG. 6A is a cross-sectional view of another exemplary first step-compensating pattern of FIG. 5 according to the present invention.

FIG. 6A is a cross-sectional view of another exemplary first step-compensating pattern of FIG. 5 according to the present invention. In FIG. 6A, the gate line 212 may be formed on the substrate 210 and a gate insulating layer 230 may be formed on the gate line 212. A first step-compensating pattern 222 is formed on the gate insulating layer 230 at an adjacent portion to the gate line 212 and a passivation layer 232 may be formed on the first step-compensating pattern 230. Although an adjacent gate line is not shown in FIG. 6A, the first step-compensating pattern 222 may be disposed at the first spacing region "Xa" (in FIG. 5) between the gate line 212 and the adjacent gate line (not shown). The first step-compensating pattern 222 may include a semiconductor pattern 222a and a data pattern 222b formed on the semiconductor pattern 222a. The semiconductor pattern 222a may be simultaneously formed with formation of a semiconductor layer (not shown) of the thin film transistor (TFT) "T" (in FIG. 5), and include the same material as that of the semiconductor layer. In addition, the data pattern 222b may be simultaneously formed with formation of the data line 214 (in FIG. 5), and may include the same material as that of the data line 214 (in FIG. 5). Thus, a first accumulated thickness "Da" of a gate line portion and a second accumulated thickness "Db" of the first step-compensating pattern portion may be formed.

Figure 6B:
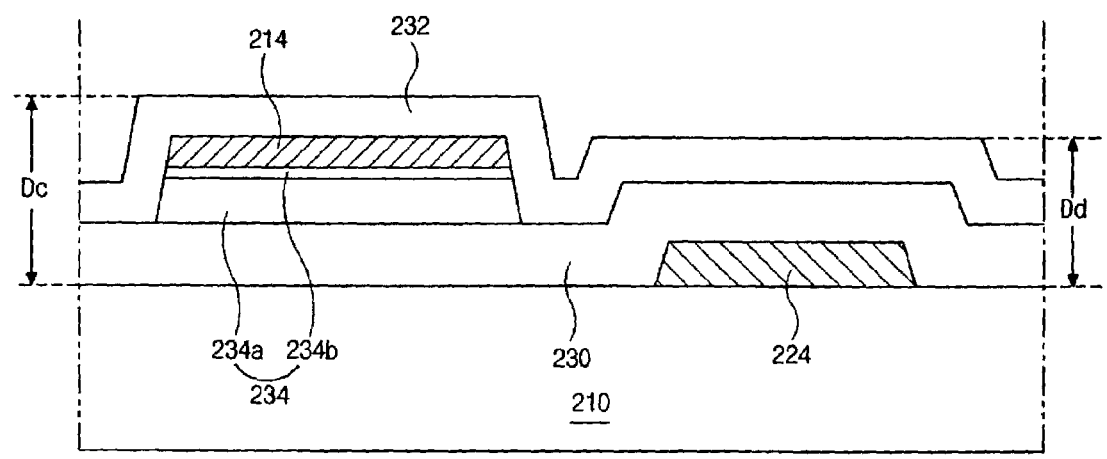
FIG. 6B is a cross-sectional view of another exemplary second step-compensating pattern of FIG. 5 according to the present invention.

FIG. 6B is a cross-sectional view of another exemplary second step-compensating pattern of FIG. 5 according to the present invention. In FIG. 6B, the second step-compensating pattern 224 may be formed on the substrate 210, and a gate insulating layer 230 may be formed on the second step-compensating pattern 224. A semiconductor layer 234 and a data line 214 that corresponds to the semiconductor layer 234 may be sequentially formed on the gate insulating layer 230 at a region adjacent to the second step-compensating pattern 224. Although an adjacent data line is not shown in FIG. 6B, the second step-compensating pattern 224 may be disposed at the second spacing region "Xb" (in FIG. 5) between the data line 214 and the adjacent data line (not shown). In addition, the semiconductor layer 234 may include an active layer 234a and an ohmic contact layer 234b formed on the active layer 234a, and a passivation layer 232 may be formed on the data line 214. The second step-compensating pattern 224 may be simultaneously formed with formation of the gate line 212 (in FIG. 6A), and may include the same material as the gate line 212 (in FIG. 6A). Thus, a third accumulated thickness "Dc" may correspond to the data line 214, and a fourth accumulated thickness "Dd" may correspond to the second step-compensating pattern 224. Since a sum of the first and second accumulated thicknesses "Da" and "Db" (in FIG. 6A) may correspond to a sum of the third and fourth accumulated thicknesses "Dc" and "Dd," an accumulated thickness difference between the gate line portion and the data line portion may be reduced.

In FIGS. 6A and 6B, the first step-compensating pattern corresponding to the data line structure may be disposed at the first spacing region between adjacent gate lines, and the second spacing region corresponding to the gate line structure may be disposed at the second spacing region between adjacent data lines. Accordingly, a uniform accumulated thickness and a uniform cell gap difference at an adjacent portion to the seal pattern are obtained. Moreover, since a top surface of the passivation layer has an unevenness, a contacting area of the seal pattern and the passivation layer (or a top layer of the passivation layer) increases and an adhesive force of the seal pattern is improved.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate having an active region and a non-active region along a peripheral portion of the active region;
   a second substrate facing and spaced apart from the first substrate, and having an active region and a non-active region along a peripheral portion of the active region;
   a seal pattern between the first and second substrates disposed along a border of the active and non-active regions;
   a gate line on an interior surface of the first substrate and crossing the seal pattern;
   a data line crossing the gate line and the seal pattern;
   a thin film transistor connected to the gate line and the data line;
   a pixel electrode connected to the thin film transistor;
   a common electrode on an interior surface of the second surface;
   a first step-compensating pattern overlapped by the seal pattern and directly over the gate line wherein the first step-compensating pattern includes a semiconductor pattern and a data pattern and the data pattern is substantially above the semiconductor pattern;
   a second step-compensating pattern overlapped by the seal pattern and directly under the data line; and
   a liquid crystal material layer between the pixel electrode and the common electrode.

2. The device according to claim 1, further comprising a gate pad connected to the gate line and a data pad connected to the data line, wherein the gate pad and the data pad are disposed at the non-active regions.

3. The device according to claim 2, wherein the thin film transistor includes an active layer, and source and drain electrodes.

4. The device according to claim 1, wherein the first step-compensating pattern includes the same material as the data line.

5. The device according to claim 1, wherein the semiconductor pattern has the same plan shape as the first step-compensating pattern.

6. The device according to claim 1, wherein the second step-compensating pattern includes the same material as the gate line.

7. The device according to claim 1, wherein the first step-compensating pattern has the same thickness as the data line and the second step-compensating pattern has the same thickness as the gate line, and wherein the first and second step compensating patterns are formed so that portions of the gate lines have the same thickness as portions of the data lines in the region of the seal pattern.

8. A fabricating method of a liquid crystal display device, comprising:
   forming a gate line and a first step-compensating pattern on a first substrate having an active region and a non-active region along a peripheral portion of the active region, the first step-compensating pattern being disposed along a border of the active and non-active regions, the first step-compensating pattern including a semiconductor pattern and a data pattern and the data pattern is substantially above the semiconductor pattern;
   forming a data line and a second step-compensating pattern, wherein the data line crosses the gate line and wherein the second step-compensating pattern is directly over the gate line and along the border of the active and non-active regions;
   forming a thin film transistor connected to the gate line and the data line;
   forming a pixel electrode connected to the thin film transistor;
   forming a common electrode on an interior surface of a second surface;
   forming a seal pattern along the border of the active and non-active regions, the seal pattern crossing the gate line and the data line;
   attaching the first and second substrates such that the pixel electrode faces the common electrode; and
   forming a liquid crystal material layer between the pixel electrode and the common electrode.

9. The device according to claim 8, wherein the first and second step-compensating patterns are formed so that portions of the gate lines have the same thickness as portions of the data lines in the region of the seal pattern, the first step-compensating pattern has the same thickness as the gate line, and the second step-compensating pattern has the same thickness as the data line.

* * * * *